United States Patent [19]

Bally

[11] Patent Number: 4,531,818
[45] Date of Patent: Jul. 30, 1985

[54] ADAPTER FOR ARRANGING AN INSTANT PICTURE CASSETTE AT A 35 MM CAMERA AND METHOD FOR MANUFACTURING THE SAME

[75] Inventor: Diego Bally, Zurich, Switzerland
[73] Assignee: Markus Grass, Italy
[21] Appl. No.: 499,830
[22] Filed: Jun. 1, 1983
[30] Foreign Application Priority Data
  Jun. 8, 1982 [CH] Switzerland ............... 3530/82
[51] Int. Cl.³ .................. G03B 17/52; G03B 17/56
[52] U.S. Cl. ............................ 354/83; 354/174; 354/295
[58] Field of Search ................ 354/83–86, 354/174, 202, 275, 288, 295

[56] References Cited
U.S. PATENT DOCUMENTS
  4,348,086  9/1982  Forscher ............... 354/83

OTHER PUBLICATIONS
Popular Photography–Oct. 1981.

Galileo Electro-Optics Corp. Technical Memorandum–Jan. 1981.

*Primary Examiner*—William B. Perkey
*Attorney, Agent, or Firm*—Ostrolenk, Faber, Gerb & Soffen

[57] ABSTRACT

An adapter for mounting an instant picture cassette to a 35 mm camera, the back panel of which is removable, comprises an adapter plate which carries a back member corresponding to the back panel of the camera as well as an instant picture cassette. In an opening of the adapter plate a fiber optic face plate is mounted by means of a resilient support of silicone rubber in a position which ascertains its contacting the film guides of the camera which define the camera's focal plane. The resilient support of the face plate allows the same to adjust its position automatically when contacting said guides. The face plate transfers the picture from the image plane of the camera to the surface of the instant picture film so that an instant picture can be taken through the optics of the 35 mm camera which is useful for producing test pictures before taking pictures by means of the normal camera.

9 Claims, 2 Drawing Figures

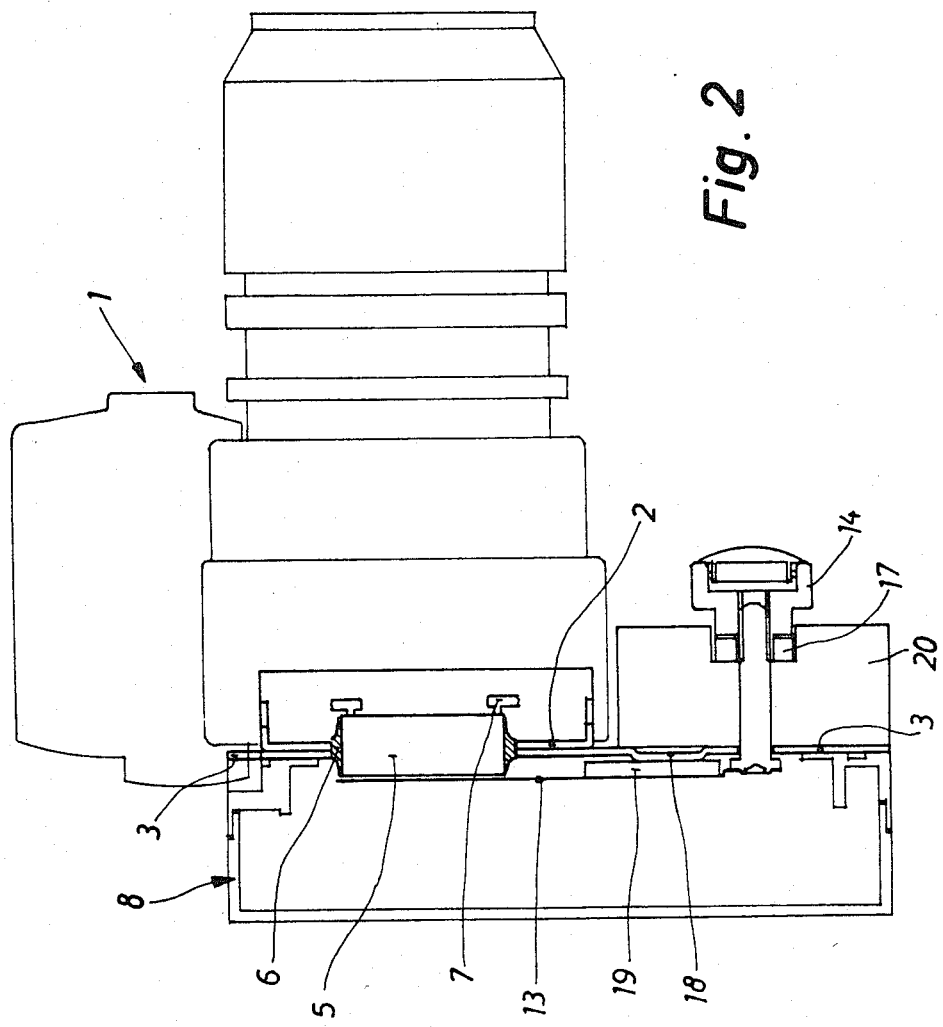

ADAPTER FOR ARRANGING AN INSTANT PICTURE CASSETTE AT A 35 MM CAMERA AND METHOD FOR MANUFACTURING THE SAME

BACKGROUND OF THE INVENTION

The present invention relates to an improved construction of an adapter for mounting an instant picture cassette to a camera, the back wall of which is removable, comprising an adapter plate which is fixedly mounted to the instant picture cassette and is carrying a back member corresponding to said removable back wall, the adapter plate and the back member carrying a fiber optic face plate arranged in an opening therein for transferring an image formed at an image plane of the camera to the plane of the film in the instant picture cassette.

DESCRIPTION OF THE PRIOR ART

An adapter of the above mentioned kind is known from U.S. Pat. No. 4,348,086. The fiber optic face plate used therein consists of a plurality of glass fibers fused together in parallel array, thereby having the ability to transfer an image from one plane to another without distortion of the image. Such face plates are commercially available at least since 1981 (Galileo Electro-Optics Corporation, Sturbridge, Mass.) In the above adapter said face plate has been used to transfer the image of the camera from the image plane to the plane of the instant picture film, which film for geometrical reasons needs to be placed outside of the image plane of the camera. The face plate, however, is rigidly mounted in a frame, which in turn is fixed to the adapter plate. Therefore, the position of the adapter plate and of the back member mounted thereto define the position of the face plate. This construction has proved to be unsatisfactory in practice. Besides the very complicated and expensive mounting procedure of the face plate, the main disadvantage results from the fact that due to this construction the position of the face plate and therefore the image definition of the instant picture are subject to variations which cannot be predicted. This is a consequence of the fact that there are always small variations in the dimensions of individual cameras of the same type which can hardly be eliminated, and that the suspension of the camera back panels are often not precise enough such that the position of the inner surface of the face plate is displaced from the image plane of the camera, which, of course, results in a picture of unsatisfactory image definition.

SUMMARY OF THE INVENTION

Hence, it is an object of the present invention to provide an improved construction of an adapter of the aforementioned kind which eliminates the described drawbacks and which guarantees an optimal image quality independently of the individual camera used.

Another object of the invention is to provide a construction which is easy to manufacture and which does not need expensive adjustment.

In order to implement these and still further objects of the invention, which will become more readily apparent as the description proceeds, said fiber optic face plate is mounted in a resilient support in the adapter plate and the back member, respectively, so that in the mounted state it bears against the focal plane defining film guides of the camera. In a preferred embodiment of the invention the outer dimensions of the face plate are chosen to be smaller than the respective measures of said opening and the support is formed by a rubber connection between the outer circumference of the face plate and the border of the opening.

This embodiment has the advantage of simple manufacture. The face plate therefor is provisionally fixed in a desired position within the opening by means of a centering whereafter the space between its circumference and the border of the opening is filled by flowable rubber, which is capable of being hardened. The centering is removed when the hardening process (under the influence of atmospheric oxygen) is finished.

The invention results in an elastic displaceability of the face plate in a direction perpendicular to the image plane. Thereby the position of the face plate is exactly adapted to the image plane of the camera since its position is given by the focal plane defining guides of the camera which results in an automatic adjustment of the face plate to its correct position.

In another embodiment of the invention the back member which replaces the camera back wall is resistant to bending to provide a rigid mounting for the resiliently displaceable face plate even after long use.

Still a further embodiment of the invention comprises a shutter, by which the face plate can be lighttightly sealed on its surface directed to the instant picture cassette. The claimed support of the face plate further allows to provide lateral shields at the shutter for direct contact with a side wall of the face plate to avoid lateral entrance of stray light.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 2 is a sectional view of the adapter in the assembled state.

DETAILED DESCRIPTION OF A PREFERRED EMBODIMENT

Figure 1:
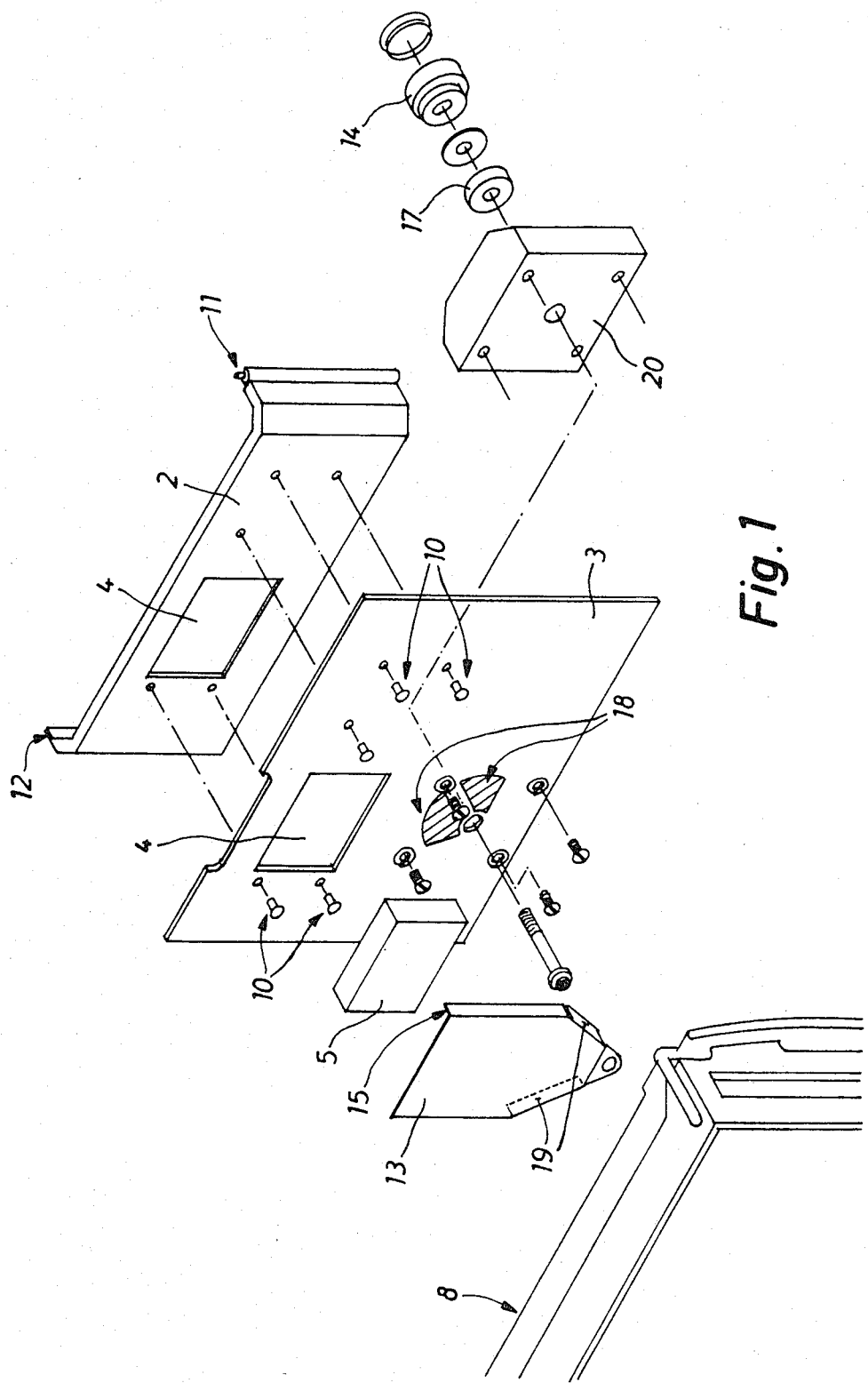
FIG. 1 shows the claimed adapter in exploded view, the camera being omitted and the instant picture cassette being exhibited only schematically.

As can be seen from these figures the adapter comprises a back member 2 and an adapter plate 3 which are firmly connected by means of several rivets 10. The back member 2 is formed like the back panel of the 35 mm camera, with which the instant picture cassette 8 should be used and replaces the same for instant picture operation. It has proved to be advantageous not to use original back panels as a back member 2, since such panels normally are not rigid enough and especially can easily be deformed. Therefore, the rigidity of conventional back panels, which rigidity is necessary for optical reasons as will be explained later, is often not sufficient. Therefore, a solid back member 2 is used which serves as a rigid support for the other components and especially for the face plate 5. Said back member on one side has a hinge 11 with removable hinge bolts which corresponds to the respective hinge system of the 35 mm camera type used and on the other side is provided with locking means 12. For mounting the instant picture cassette 8 to the 35 mm camera the back panel of the camera has to be removed first and can be replaced then by the back member 2.

The adapter plate 3 connected to the back member 2 in turn is fixed to the instant picture cassette, as can be seen from FIG. 2, and forms the front wall of the cassette. The back member 2 as well as the adapter plate 3 are provided with an opening 4 for the fiber optic face plate 5, which opening is aligned with the optical axis of the 35 mm camera. The fiber optic face plate 5 has a surface size which at least corresponds to the size of the image in the image plane of the camera and has a thickness, which is given by the necessary transfer distance from the image plane of the camera to the film plane of the instant picture cassette. Such fiber optic face plates are commercially available as mentioned above.

The inner size of the opening 4 exceeds the outer size of the face plate such that there is space for the resilient support of the same. Surprisingly, it has been found that a resilient mounting of the face plate, i.e. a mounting which allows little displacements from the original position transversely to the extension of the plate, considerably improves the quality of the pictures, since thereby the face plate is able to adapt its position exactly to the focal plane defining film guides 7 of the camera (see FIG. 2) which provides for an automatic positioning independently of variations in the size of individual cameras used and of possible deformations caused by longer use.

The resilient support of the face plate 5 in the back member 2 and the adapter plate 3 preferably is realized by means of a silicone rubber mounting 6 as can be seen from FIG. 2. For assembling the adapter of the invention the face plate 5 first is positioned within the opening 4 by means of a centering such that laterally an equal space to the edge of the opening is formed and such that the face plate 5 in the assembled state bears against the film guides 7 of the camera. In this position the face plate 5 is fixed to the back member 2 and the adapter plate 3 by means of a bead of fluid, cold vulcanizable silicone rubber. After hardening of the silicone rubber to form a resilient support body 6 the centering is removed. Preferably black colored, i.e. lighttight silicone rubber is used to provide a sealing of the cassette against the entrance of light as will be described below in more detail.

The face plate 5 mounted like this is slightly displaceable perpendicularly to the surface of the plate. Since in the assembled state it bears with its one surface against the film guides 7 of the camera, it is correctly positioned independently of possible variations in the size of the related elements. The other surface of the face plate 5 then is in contact with the surface of the instant picture film. A correct contact is guaranteed by the fact that in commercially available instant picture cassettes (sold by Polaroid) the film is urged outwards by means of springs such that independently of the actual position of the face plate the film surface bears against its inner surface.

Before describing further details of the claimed construction, the operation of the device will now be described on the basis of the aforementioned features. If a 35 mm camera is used to make an instant picture, e.g. for testing the correct setting of the camera or the chosen view, the back panel of the camera 1, which of course does not contain a film, is removed. Then the instant picture cassette is fixed at the camera by means of the adapter. If the cassette is provided with an instant picture film, a picture can be taken through the optics of the 35 mm camera. On the instant picture film, which has a size of 7 cm × 9 cm, only the area corresponding to the picture of the 35 mm camera is exposed. Since this area is not in the center of the instant picture film as can be seen from FIG. 2, but near to its periphery, a second picture can be taken on the same film merely by pulling out the instant picture film for an appropriate length. On the cassette 8 there is preferably a mark which shows how far the film has to be pulled out for the second picture. After having taken the second picture the film is removed from the cassette thereby initiating the developing process and after a short time the pictures are ready.

Since, when pulling the exhibited film out of the cassette, the next film automatically replaces the removed film, at least part of the new film is unwillingly exposed through the face plate when the cassette is removed from the camera. This situation, however, occurs quite often since it is the main purpose of this device to be used before a normal picture is taken for which the cassette has to be removed later. Therefore, a big part of the capacity of the instant picture cassette is wasted.

In order to avoid this drawback there is a rotary shutter 13 for preventing the entrance of light into the cassette through the face plate. The rotary shutter 13 is supported in a block 20 at the adapter plate 3 and is operated from the outside by means of a knurled knob 14 from a closed into an open position and vice versa. By this shutter the face plate can be sealed lighttightly. The entry of stray light through the face plate is inhibited by a lateral shield 15, which in the closed state contacts the lighttight rubber support (FIG. 1). Said support of the face plate 5 therefore allows to provide for a completely lighttight seal of the cassette which would not be the case in the known device since there are lateral holding members or frames to support the face plate.

As already mentioned the instant picture film contacts the inner surface of the face plate 5. In order to slide the rotary shutter 13 between the film and the face plate 5 and in order to define clear end positions, the adapter plate 3 comprises a profile 18, which cooperates with flanges 19 at the rotary shutter 13. The shutter 13 is slightly displaceable in axial direction due to the rubber sponge ring 17 which provides for an elastic support. While the shutter in its opened and closed position is in an axially retracted position, it is lifted a little in its intermediate positions. Therefore, while moving the shutter from its opened to its closed position, the instant picture film is pressed back a little so that the shutter can slide between the face plate and the film. In its closed end position the shutter is axially retracted again to contact the face plate. In order to avoid scratching of the film by the shutter, the respective surface of the shutter is polished. Every time the cassette is removed from the camera, the rotary shutter 13 is closed first, thereby avoiding the entry of light and the unwilling exposure of the instant picture film.

The described adapter allows a considerably better exploitation of the expensive instant picture films since no pictures are lost due to insufficient quality or unwilling exposure. Furthermore, the adapter of the invention is easy to manufacture, especially as to the mounting of the face plate and does not need expensive adjustment to the individual camera used in connection therewith.

While there is shown and described a present preferred embodiment of the invention, it is to be distinctly understood that the invention is not limited thereto, but may be otherwise variously embodied and practiced within the scope of the following claims. ACCORDINGLY,

What is claimed is:

1. An improved adapted for mounting an instant picture cassette to a camera, wherein the back wall of the camera is removable, the adapter comprising an adapter plate which is fixedly mounted to the instant picture cassette; a back member corresponding to the removable back wall of the camera carried on the adapter plate, the adapter plate and the back member each having an opening therein and the openings together contain a fiber optic face plate for transferring an image formed at an image plane of the camera to the plane of the film in the instant picture cassette, a resilient support for the face plate within the adapter plate and the back member for causing the face plate to bear against the focal plane defining guide members of the camera in the assembled state.

2. The adapter of claim 1, wherein the fiber optic face plate has a periphery of a smaller size than the size of the edge defining the respective opening in the adapter plate, the resulting interspace between the periphery of the fiber optic face plate and the surrounding edge of the opening in the adapter plate containing the resilient support and that support being formed by a bead of rubber extending between the periphery of the face plate and the edge of the opening.

3. The adapter as defined in claim 2, wherein the bead of rubber is formed from initially fluid, cold vulcanized rubber.

4. The adapter as defined in claim 1, wherein the back member is formed from a rigid element which is resistant to bending.

5. The adapter as defined in either of claims 1 or 2, wherein the resilient support forms a lighttight connection between the face plate and the adapter plate.

6. The adapter as defined in claim 1, further comprising a shutter provided on the cassette side of the adapter plate, the shutter being movable between two positions, including a first position wherein the shutter covers the face plate for a lighttight seal of the cassette and a second position wherein the shutter is placed outside the face plate surface.

7. The adapter of claim 6, wherein the shutter is a rotary shutter which is movable by rotating; a knob mounted on the outer surface of the adapter plate for operating the shutter to rotate.

8. The adapter of claim 7, further comprising a profile at the adapter plate, the rotary shutter being resiliently supported and axially displaceable by means of the profile such that the shutter is axially lifted between its end rotary positions with respect to the adapter plate.

9. The adapter of claim 6, wherein the shutter comprises a lateral shield for preventing the lateral entrance of stray light of the face plate, the lateral shield being in contact with a respective side of the face plate in the closed position of the shutter.

* * * * *